United States Patent [19]
Yoshida et al.

[11] Patent Number: 5,317,431
[45] Date of Patent: May 31, 1994

[54] LIQUID CRYSTAL DISPLAY DEVICE WITH SCATTERING WHITE LAYER AND COLOR FILTER

[75] Inventors: Hidefumi Yoshida; Kazutaka Hanaoka, both of Kawasaki, Japan

[73] Assignee: Fujitsu Limited, Kawasaki, Japan

[21] Appl. No.: 979,635

[22] Filed: Nov. 20, 1992

[30] Foreign Application Priority Data

Nov. 21, 1991 [JP] Japan ................ 3-306283

[51] Int. Cl.$^5$ .................... G02F 1/13; G02F 1/133; G02F 1/335
[52] U.S. Cl. ........................... 359/51; 359/53; 359/68
[58] Field of Search ................ 359/51, 53, 68

[56] References Cited

U.S. PATENT DOCUMENTS

| | | | |
|---|---|---|---|
| 3,840,695 | 10/1974 | Fischer | 358/61 |
| 4,560,241 | 12/1985 | Stolov et al. | 359/68 |
| 4,581,608 | 4/1986 | Aftergut et al. | 359/51 |
| 4,654,117 | 3/1987 | Aoki et al. | 359/68 |
| 4,671,617 | 6/1987 | Hara | 359/53 |
| 4,709,990 | 12/1987 | Oana | 359/68 |
| 4,773,737 | 9/1988 | Yokono et al. | 359/68 |
| 5,142,389 | 8/1992 | Fergason | 359/51 |
| 5,194,973 | 3/1993 | Isogai et al. | 359/51 |
| 5,878,741 | 11/1989 | Fergason | 359/51 |

FOREIGN PATENT DOCUMENTS

| | | | |
|---|---|---|---|
| 0171766 | 2/1986 | European Pat. Off. | |
| 0347790 | 12/1989 | European Pat. Off. | |
| 0435676 | 7/1991 | European Pat. Off. | 359/70 |
| 0488164 | 6/1992 | European Pat. Off. | |
| 2595155 | 9/1987 | France | |
| 63-60427 | 3/1988 | Japan | 359/68 |
| 3-198028 | 8/1991 | Japan | |
| 4-143723 | 5/1992 | Japan | |
| 88/02128 | 3/1988 | PCT Int'l Appl. | |
| 2137397 | 10/1984 | United Kingdom | 358/68 |

Primary Examiner—Anita P. Gross
Attorney, Agent, or Firm—Staas & Halsey

[57] ABSTRACT

A liquid crystal display device including a first liquid crystal layer having a dichroic dye contained therein, and a second liquid crystal layer having light scattering properties. The first and the second liquid crystal layers are stratified separately from each other and superposed one above the other between a pair of glass plates. A color filter is provided on one of the plates. The threshold voltage of the first liquid crystal layer is, for example, lower than the threshold voltage of the second liquid crystal layer ($V_1 < V_2$). Accordingly, when the voltage applied to the liquid crystal is lower than the threshold voltage ($V_1$) of the first liquid crystal layer, the light is absorbed by the dichroic dye to produce a black spot. When the voltage is higher than the threshold voltage ($V_1$) of the first liquid crystal layer and lower than the threshold voltage ($V_2$) of the second liquid crystal layer, the second liquid crystal layer becomes white and cloudy thereby producing a white spot on the display. When voltage is higher than the threshold voltage ($V_2$), the light transmits both first and second liquid crystal layers, and the color filter can be directly visualized.

13 Claims, 8 Drawing Sheets

V< V₁

V>V₁

LIQUID CRYSTAL DISPLAY DEVICE WITH SCATTERING WHITE LAYER AND COLOR FILTER

BACKGROUND OF THE INVENTION

FIELD OF THE INVENTION

The present invention relates to a liquid crystal color display device with a scattering white layer and a color filter that realizes good contrast.

DESCRIPTION OF THE RELATED ART

Recently, portable office automation apparatuses such as note type personal computers and note type word processors have gained popularity and liquid crystal display devices have been adapted for these portable office automation apparatuses. There is an increasing demand to reduce the weight and the power consumption of the portable office automation apparatuses for easy transportation thereof.

A conventionally typical liquid crystal display device comprises a liquid crystal panel including a twisted nematic liquid crystal inserted between a pair of opposite transparent plates. Polarizers are arranged on either side of the liquid crystal panel so that the polarizer on the light incident side selectively transmits a predetermined linear polarized light, the liquid crystal modulates the linear polarized light, and the polarizer on the light emitting side transmits or blocks the linear polarized light that is rotated 90 degrees from that of the incident polarized light.

The liquid crystal panels are classified as either a transmitting type or a reflecting type, and the transmitting type, which includes a back light on the rear side of the liquid crystal panel, is more frequently used. In a liquid crystal display device using polarizers, it is necessary to include an illuminating means such as the back light to provide a bright display since approximately half of the incident light is absorbed by the polarizer and the amount of light transmitting the polarizer is reduced. When the illuminating means such as the back light is used, the amount of power consumption is increased so that in the case of a portable office automation apparatus, the life of a dry battery accommodated therein is shortened. In addition, when a color filter having red, green, and blue colors is used in a transparent type liquid crystal display device to display a color image, the light is absorbed somewhat by the color filter. Also, when a black matrix is used with the color filter, the amount of available light is further reduced. Accordingly, it is difficult to obtain a bright display without a back light in conventional liquid crystal display devices.

Japanese Unexamined Patent Publication (Kokai) No. 3-198028 discloses a liquid crystal color display device comprising a plurality of superposed liquid crystal layers containing dichroic dyes and having different threshold voltages, respectively, and substituting the provision of a color filter having color portions arranged in a plane. By controlling the voltage applied to the liquid crystal so that the applied voltage is higher or lower than the respective threshold voltages, it is possible to provide dichroic dye with a specific color in one of the superposed liquid crystal layers. However, this liquid crystal display device presents a color based on a subtractive color mixing and a superposition of colors in the two liquid crystal layers approaches black, and accordingly, the number of available colors is less and the contrast is poor.

SUMMARY OF THE INVENTION

The object of the present invention is to provide a liquid crystal display device that can provide a bright display without a back light and realize many colors.

According to the present invention, there is provided a liquid crystal display device comprising first and second opposite plates, a first liquid crystal layer having a threshold voltage and a dichroic dye contained therein, a second liquid crystal layer having a threshold voltage different from that of the first liquid crystal layer and light scattering properties, and a color filter provided in one of the plates; the first and the second liquid crystal layers being stratified separately from each other and superposed one above the other between the plates.

With this arrangement, for example, when the voltage applied to the liquid crystal is lower than the threshold voltage of the first liquid crystal layer containing the dichroic dye, the light is absorbed by the dichroic dye of the first liquid crystal layer to produce a black point on the display. When the voltage applied to the liquid crystal is higher than the threshold voltage of the first liquid crystal layer, the light transmits the liquid crystal layer. Under the latter conditions (i.e., the voltage is higher than the threshold voltage of the first liquid crystal layer), when the voltage applied to the liquid crystal is lower than the threshold voltage of the second liquid crystal layer having light scattering properties, the light is scattered to render the second liquid crystal layer sufficiently white and cloudy and thereby produce a white spot on the display. When voltage applied to the liquid crystal is higher than the threshold voltage of the second liquid crystal layer, the light transmits the second liquid crystal layer (and thus transmits both first and second liquid crystal layers), and when the light transmits both first and second liquid crystal layers, the color filter can be directly visualized. The color filter includes a plurality of color portions within each color portions within each pixel region, and it is possible to realize many colors obtained by an adequate combination of selected color portions.

According to another aspect of the present invention, there is provided a liquid crystal display device comprising a pair of opposite plates, a liquid crystal layer inserted between the plates, an electrode means provided in one of the plates, and picture electrodes and a color filter provided in the other plate; said other plate having first and second surfaces; the color filter being provided in the first surface of the other plate, and the picture electrodes with thin filmed transistors being provided in the second surface of the other plate.

In this case, the corresponding positioning of the color filter and the picture electrodes can be facilitated since the color filter and the picture electrodes are provided in the other common plate. Also, it is possible to form the picture electrodes and the thin filmed transistors directly on the plate, compared with an arrangement in which a color filter is provided in a plate and picture electrodes are provided over the color filter.

This feature can be used in combination with the first feature of the above described liquid crystal display device or with features of the other liquid crystal display device.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
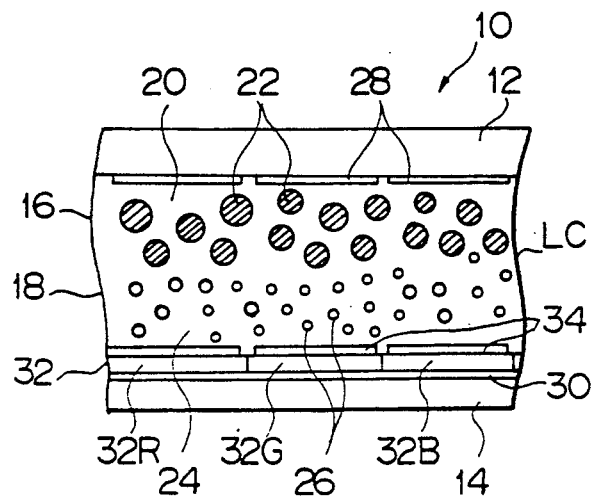
FIG. 1 is a cross-sectional view of a liquid crystal display device according to the first embodiment of the present invention.

FIG. 1 shows the liquid crystal display device according to the first embodiment of the present invention. The liquid crystal display device includes a liquid crystal panel 10 comprising a first glass plate 12, a second glass plate 14 opposed to the first glass plate 14 with a small gap therebetween, and a liquid crystal LC inserted between the first and second glass plates 12 and 14. The liquid crystal LC comprises a first liquid crystal layer 16 having a threshold voltage $V_1$ and a dichroic dye 25 (FIG. 4A) contained therein; a second liquid crystal layer 18 having a threshold voltage $V_2$ different from threshold voltage $V_1$ of the first liquid crystal layer 16. The second liquid crystal layer 18 does not substantially contain a dichroic dye but has light scattering properties. The first and second liquid crystal layers 16 and 18 are stratified separately from each other and superposed one above the other between the glass plates 12 and 14. Polarizers are not used in the embodiments.

In FIG. 1, the first liquid crystal layer 16 having the dichroic dye 25 comprises polymer dispersed liquid crystal capsules, i.e., liquid crystal capsules 22 are dispersed in a layer of transparent resin 20. 5 percent in weight of the dichroic dye 25 (for example, S387 distributed from Mitsui Toatsu Dye K.K.) is contained in the liquid crystal capsules 22. Also, the second liquid crystal layer 18 containing no dichroic dye comprises polymer dispersed liquid crystal capsules, i.e., liquid crystal capsules 26 are dispersed in a layer of transparent resin 24. Dichroic dye is not added in the liquid crystal capsules 26.

In FIG. 1, the first glass plate 12 is transparent and is such that the first glass plate 12 constitutes a display on a screen to be viewed. Picture electrodes 28 are provided on the inner surface of the first glass plate 12.

The second glass plate 14 is also transparent and a reflecting layer 30 is provided on the inner surface of the second glass plate 14. Therefore, the embodiment is a reflective type liquid crystal display device. However, according to the present invention, it is possible to omit the reflecting layer 30 and to provide a light scattering layer in place of the reflecting layer 30. Alternatively, it is possible to omit the reflecting layer 30 and to form the second glass plate 14 from a white glass plate.

A color filter 32 is provided on the reflecting layer 30. The color filter 32 includes red color portions 32R, green color portions 32G, and blue color portions 32B. Three color portions 32R, 32G, and 32B form one picture element or pixel area. Picture electrodes 34 are provided on the color portions 32R, 32G, and 32B, respectively. The picture electrodes 28 of the first glass plate 12 are provided in correspondence with the picture electrodes 34 of the second glass plate 14. However, it is possible that one of the picture electrodes 28 and 34 can be replaced by a common electrode provided continuously over the associated glass plate. In this case, it is preferable to arrange the picture electrodes 34 and the color filter 32 in the second glass plate 14 so as to facilitate the positioning of the picture electrodes 34 and the color filter 32.

Figure 2:
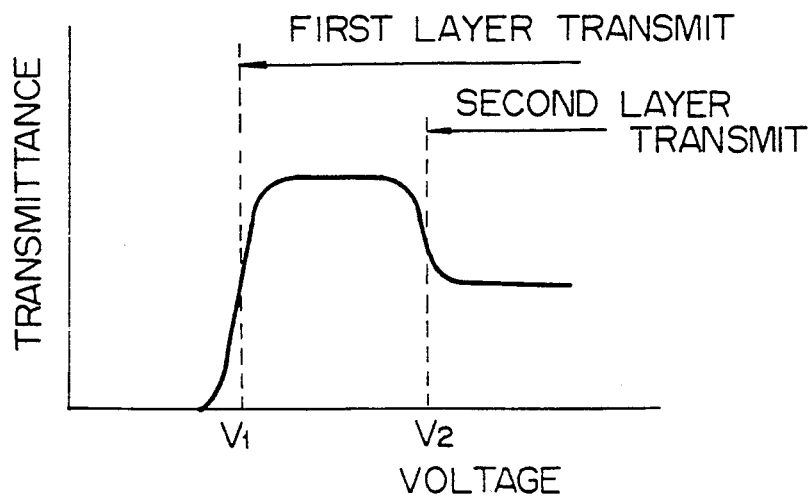
FIG. 2 is a diagram illustrating a relationship between the applied voltage and the transmission of the light.

Referring to FIG. 2, the first liquid crystal layer 16 containing the dichroic dye 25 has the threshold voltage $V_1$ and the second liquid crystal layer 18 containing no dichroic dye has threshold voltage $V_2$. In the embodiment of FIG. 1, the relationship $V_1 < V_2$ exists. Accordingly, when the voltage applied between the picture electrodes 28 and 34 is lower than the threshold voltage $V_1$ of the first liquid crystal layer 16, the light incident from the first glass plate 12 is absorbed by the dichroic dye 25 of the first liquid crystal layer 16 so as to produce a black spot on the display. When the applied voltage is higher than the threshold voltage $V_1$ of the first liquid crystal layer 16 and lower than the threshold voltage $V_2$ of the second liquid crystal layer 18, the light transmits the first liquid crystal layer 16 but is scattered thereby making the second liquid crystal layer 18 sufficiently white and cloudy or turbid and producing a white spot on the display. When applied voltage is higher than the threshold voltage $V_2$ of the second liquid crystal layer 18, the light transmits the first and the second liquid crystal layers 16 and 18, and accordingly, a person on the side of the first glass plate 12 can see any one or any combination of the color portions 32R, 32G, and 32B of the color filter 32 beyond the transparent liquid crystal layers 16 and 18. It is thus possible to realize a color display with many colors using an adequate combination of colors for every picture.

Referring to FIGS. 3 and 4, the manner of transmission of the light in the first and the second liquid crystal layers 16 and 18 comprising the polymer dispersed liquid crystal capsules 22 and 26 is illustrated in detail. The first and the second liquid crystal layers 16 and 18 are shown individually between the glass plates 12 and 14, in FIGS. 3 and 4, respectively. Also, dimensions relating to the thickness of the first and the second liquid crystal layers 16 and 18, and the first and the second glass plates 12 and 14 are shown.

Figure 3A:
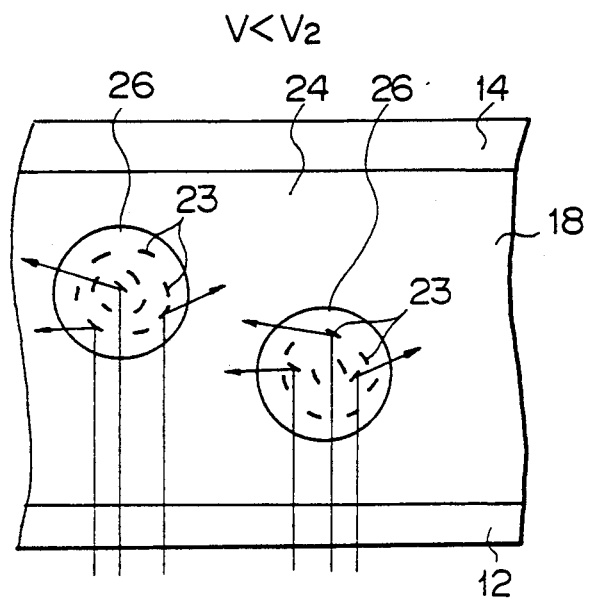
FIG. 3A is a view illustrating the manner of the light transmitted in the second liquid crystal layer when the applied voltage is lower than the threshold voltage.
Figure 3B:
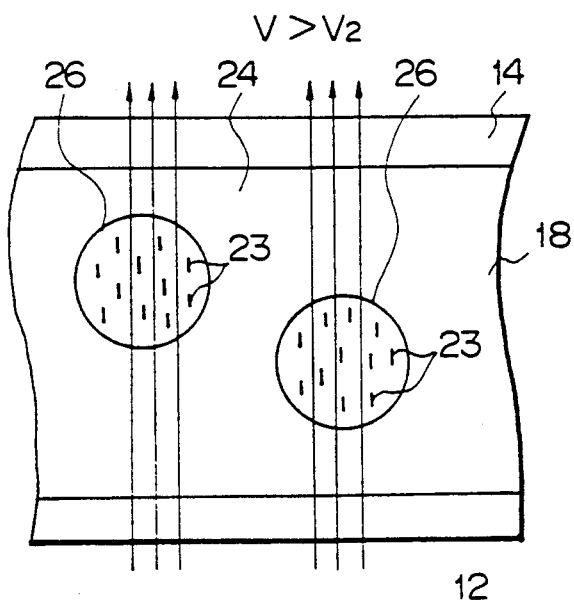
FIG. 3B is a view similar to FIG. 3A but showing when the applied voltage is higher than the threshold voltage.

As shown in FIGS. 3A and 3B, the second liquid crystal layer 18 comprises liquid crystal capsules 26 that are dispersed in the transparent resin 24. The liquid crystal capsules 26 comprise liquid crystal molecules 23 gathered together like oil droplets.

FIG. 3A shows the liquid crystal display device when the voltage is not applied (the applied voltage is lower than the threshold voltage $V_2$ of the second liquid crystal layer 18), in which the liquid crystal molecules 23 of each of the liquid crystal capsules 26 are randomly distributed. The light incident to the liquid crystal display device impinges against the liquid crystal molecules 23 of the liquid crystal capsules 26, as shown by the arrows, and are scattered in all directions thereby creating what appears to be a white cloud.

FIG. 3B shows the liquid crystal display device when the voltage is applied (the applied voltage is higher than the threshold voltage $V_2$ of the second liquid crystal layer 18), in which the liquid crystal molecules 23 of each of the liquid crystal capsules 26 rise perpendicular to the surface of the first and the second glass plates 12 and 14. Accordingly, the light incident to the liquid crystal display device transmits each of the liquid crystal capsules 26, as shown by the arrows, which is well known in a polymer dispersed liquid crystal display device.

Figure 4A:
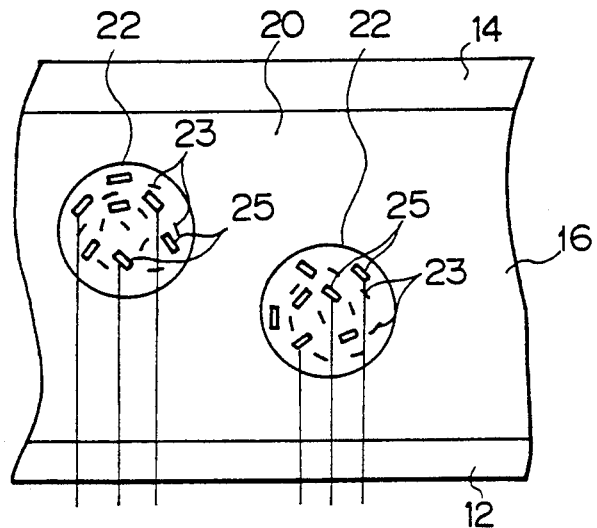
FIG. 4A is a view illustrating the manner of the light absorbed in the first liquid crystal layer when the applied voltage is lower than the threshold voltage.
Figure 4B:
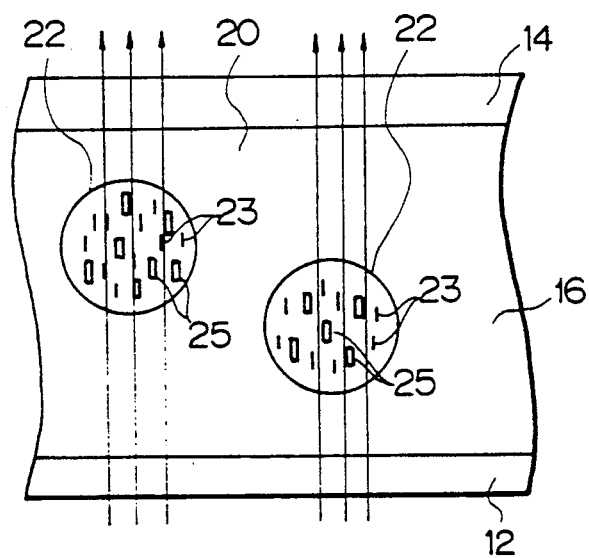
FIG. 4B is a view similar to FIG. 4A but shows when the applied voltage is higher than the threshold voltage.

As shown in FIGS. 4A and 4B, the first liquid crystal layer 16 containing the black dichroic dye 25 also comprises liquid crystal capsules 22 that are dispersed in the transparent resin 20. The liquid crystal capsules 22 comprise liquid crystal molecules 23 gathered together like oil droplets. The molecules of the dichroic dye 25 are added between the liquid crystal molecules 23. the molecules of the dichroic dye 25 have an elongated rod-like shape and molecules of the dichroic dye 25 are randomly distributed similar to the liquid crystal molecules 23.

FIG. 4A shows the liquid crystal display device when the voltage is not applied (the applied voltage is lower than the threshold voltage $V_1$ of the first liquid crystal layer 16), in which the liquid crystal molecules 23 and the molecules of the dichroic dye 25 of each of the liquid crystal capsules 22 are randomly distributed. In this case, when the light is incident to the liquid crystal display device, as shown by the arrows, the light impinges against the molecules of the dichroic dye 25 and absorbed by the dichroic dye 25. Accordingly, this condition appears black.

FIG. 4B shows the liquid crystal display device when the voltage is applied (the applied voltage is higher than the threshold voltage $V_1$ of the first liquid crystal layer 16), in which the liquid crystal molecules 23 and the molecules of the dichroic dye 25 of each of the liquid crystal capsules 22 rise perpendicular to the surface of the first and the second glass plates 12 and 14. Accordingly, the light incident to the liquid crystal display device transmits each of the liquid crystal capsules 22, as shown by the arrows. The dichroic dye 25 thus has a property of absorbing the light or allowing the light to be transmitted in accordance with the angular relationship with the incident light.

The operation of the embodiment of FIG. 1 is a combination of the operations of the first and the second liquid crystal layers 16 and 18 of FIGS. 3A and 3B, and 4A and 4B. As explained above, it is possible, according to the present invention, by controlling the applied voltage, to produce a black spot by the first liquid crystal layer 16, to produce a white spot by the second liquid crystal layer 18 when the light transmits the first liquid crystal layer 16, or produce a color spot by the color filter 32 when the light transmits the first and the second liquid crystal layers 16 and 18. In the latter case, a person directly views the color filter 32.

The color filter 32 has a plurality of color portions 32R, 32G, and 32B in one picture element or pixel area, and it is possible to realize many colors using an adequate combination of selected color portions 32R, 32G, and 32B. For, example, it is possible to present one of red, green and blue on the display by controlling the voltage so that the light transmits the first and second liquid crystal layers 16 and 18 at only one of the color portions among the color portions 32R, 32G, and 32B. In this case, if the voltages are controlled so that the light is absorbed by the first liquid crystal layer 16 at the remaining two color portions, it is possible to present a color in the field of black. Alternatively, if the voltages are controlled so that the light is scattered by the second liquid crystal layer 18 at the remaining two color portions, it is possible to present a color in the field of white. Also, it is possible to present a color obtained from a combination of red, green and blue by an additive color mixing process on the display by controlling the voltage so that the light transmits the first and second liquid crystal layers 16 and 18 at two color portions among the color portions 32R, 32G, and 32B.

Figure 5A:
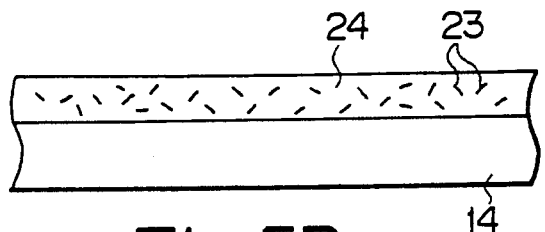
FIGS. 5A and 5B are views illustrating an example method of forming liquid crystal capsules.
Figure 5B:
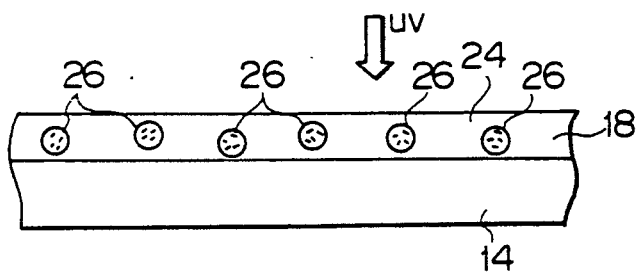

FIGS. 5A and 5B are views illustrating an example of forming the second liquid crystal layer 18 containing no dichroic dye. The first liquid crystal layer 16 containing the dichroic dye 25 can be formed in a similar process. First, the liquid crystal 23 is mixed in a material of a transparent resin 24 (the liquid crystal 23 containing the dichroic dye 25 is mixed in a material of a transparent resin 20 in the case of the first liquid crystal layer 16), and the mixture of the liquid crystal 23 and the material of the resin 24 is applied to the second glass plate 14 by a spin coating method or the like, as shown in FIG. 5A. Then an ultraviolet beam (UV) is irradiated onto the mixture, as shown in FIG. 5B, so that the resin 24 is cured with the simultaneous separation of the liquid crystal 23 from the resin 24 to cause the liquid crystal capsules 26 dispersed in the transparent resin 24 to gather like oil droplets.

Figure 6:
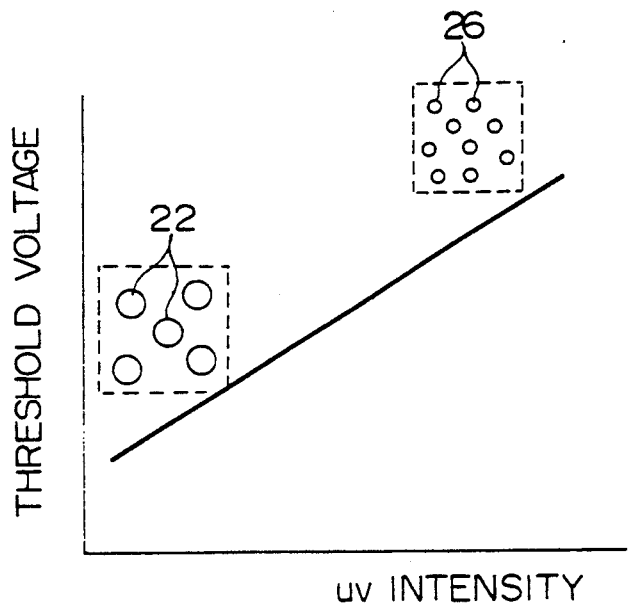
FIG. 6 is a graph illustrating the relationship between the threshold voltage and the intensity of the ultraviolet beam during formation of liquid crystal capsules and the relationship between the diameter of the liquid crystal capsules and the intensity of the ultraviolet beam.

The diameter of the liquid crystal capsules 26 is dependent on the intensity of the ultraviolet beam. For example, FIG. 6 shows a relationship between the threshold voltage and the intensity of the ultraviolet beam and a relationship between the diameter of the liquid crystal capsules 26 and the intensity of ultraviolet beam. It can be seen that the lower the intensity of the ultraviolet beam, the greater the diameter of the liquid crystal capsules 22 or 26, and inversely, the higher the intensity of the ultraviolet beam, the smaller the diameter of the liquid crystal capsules 22 or 26. Also, the threshold voltage of the liquid crystal capsules 22 or 26 is in a generally linear relationship with the intensity of the ultraviolet beam. In the embodiment of FIG. 1, there is a relationship $V_1 < V_2$ between the threshold voltage $V_1$ of the first liquid crystal layer 16 and the threshold voltage $V_2$ of the second liquid crystal layer 18, as explained. To satisfy this relationship, the liquid crystal capsules 22 having a lower threshold voltage $V_1$ are formed by applying a relatively low intensity ultraviolet beam, and the liquid crystal capsules 26 having the higher threshold voltage $V_2$ are formed by applying a relatively high intensity ultraviolet beam.

Also, the resin 24 is hardened by irradiation of the ultraviolet beam. Accordingly, it is possible to form the second liquid crystal layer 18 on the second glass plate 14, and thereafter, to form the first liquid crystal layer 16 on the second liquid crystal layer 18. Thus the first liquid crystal layer 16 and the second liquid crystal layer 18 are not mixed together, but are stratified separately from each other and superposed one above the other. Alternatively, it is possible to form, separately, the first and the second liquid crystal layers 16 and 18 on the first and the second glass plates 12 and 14, respectively, and thereafter to superpose two components together. In this case too, the first and the second liquid crystal layers 16 and 18 are not mixed together, but are stratified separately from each other and superposed one above the other.

In the above described embodiment, both the first and the second liquid crystal layers 16 and 18 comprise polymer dispersed liquid crystal capsules 26. However, if one of the first and the second liquid crystal layers 16 and 18 comprises polymer dispersed liquid crystal capsules 26, the resin 20 or 24 in that layer is hardened and the two liquid crystal layers 16 and 18 are not mixed together even if the other liquid crystal layer does not comprise polymer dispersed liquid crystal capsules. Therefore, it is not necessary to provide a separating plate between the first and the second liquid crystal layers 16 and 18.

Figure 7:
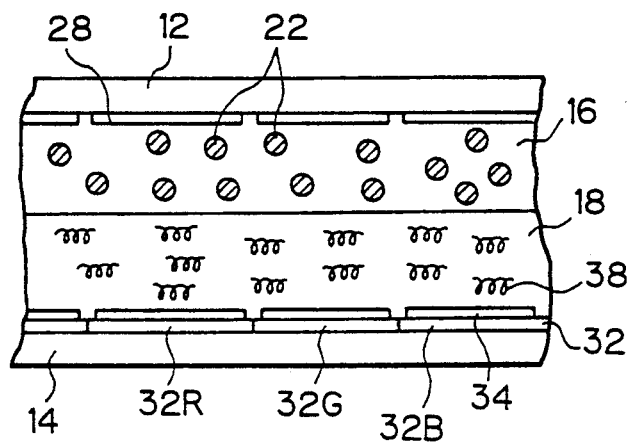
FIG. 7 is a view of a liquid crystal display device according to the second embodiment of the present invention.

FIG. 7 shows the second embodiment of the present invention comprising a first liquid crystal layer 16 comprising polymer dispersed liquid crystal capsules and a second liquid crystal layer 18 having light scattering properties to provide a white display, for example, a phase change liquid crystal 38. In FIG. 7, the dichroic dye 25 is added to the liquid crystal capsules 22 of the first liquid crystal layer 16. It is possible to use other liquid crystals other than the phase change liquid crystal, for example, a guest-host type nematic liquid crystal or other guest-host type liquid crystal.

Figure 8:
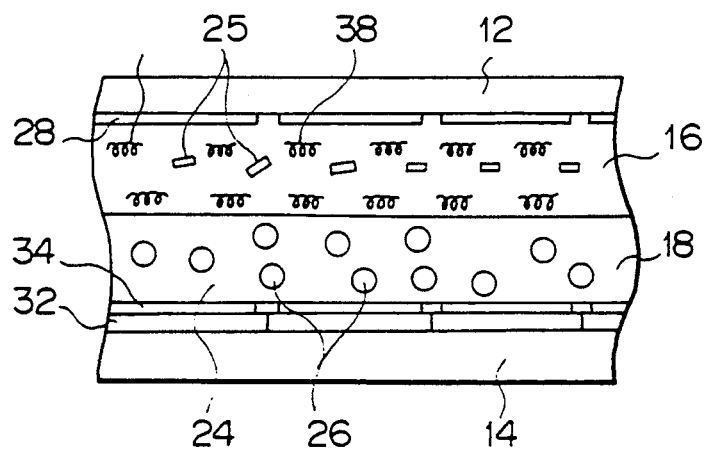
FIG. 8 is a view of a liquid crystal display device according to the third embodiment of the present invention.

FIG. 8 shows the third embodiment of the present invention comprising a first liquid crystal layer 16 comprising a quest host type liquid crystal, e.g., a phase change liquid crystal 38 or nematic liquid crystal or smectic liquid crystal 38 with dichroic dye 25 and a second liquid crystal layer 18 comprising polymer dispersed liquid crystal capsules. In FIG. 8, the dichroic dye 25 is added to the first liquid crystal layer 16 and no dichroic dye is added to the liquid crystal capsules 26 of the second liquid crystal layer 18. Also in the embodiments of FIGS. 7 and 8, it is not necessary to provide a separating plate between the first and the second liquid crystal layers 16 and 18.

Figure 9:
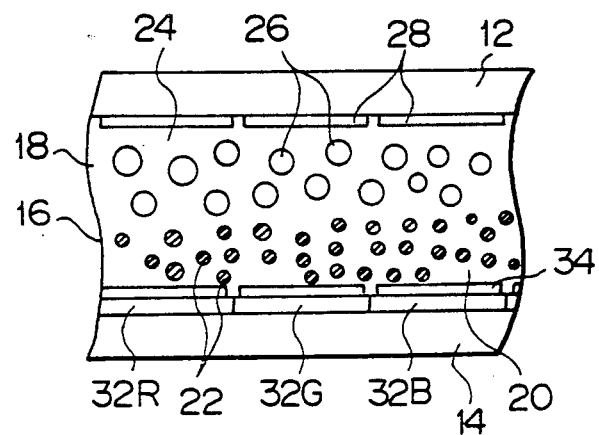
FIG. 9 is a view of a liquid crystal display device according to the fourth embodiment of the present invention.

FIG. 9 shows the fourth embodiment of the present invention in which, in contrast to the embodiment of FIG. 1, a second liquid crystal layer 18 having liquid crystal capsules 26 with a larger diameter is arranged on the side of the first glass plate 12 having a display formed thereon and a second liquid crystal layer 18 having liquid crystal capsules 22 with a smaller diameter is arranged on the side of the opposite glass plate 14. The operation of this embodiment is similar to the embodiment of FIG. 1. In this case, however, the threshold voltage of the second liquid crystal layer 18 containing no dichroic dye is $V_1$ and the threshold voltage of the first liquid crystal layer 16 containing dichroic dye 25 is $V_2$, with the relationship $(V_1 < V_2)$. Accordingly, a white color is present on the display when the applied voltage is lower than the threshold voltage $V_1$ of the second liquid crystal layer 18, a black color is present on the display when the applied voltage is between the threshold voltages $V_1$ and $V_2$, and colors are present on the display when the applied voltage is higher than threshold voltage $V_2$.

Figure 10:
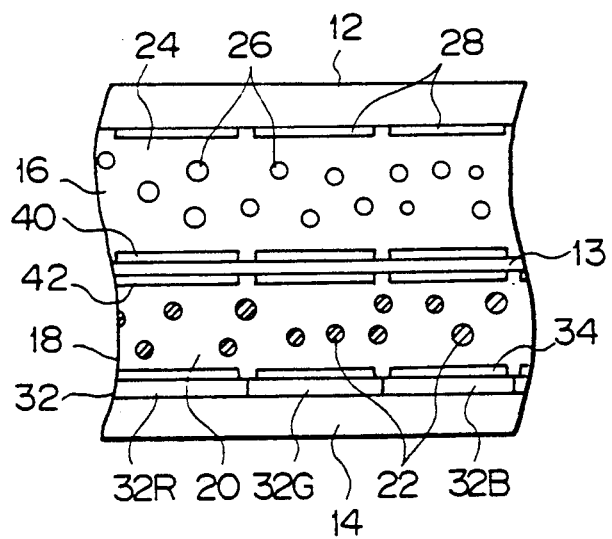
FIG. 10 is a view of a liquid crystal display device according to the fifth embodiment of the present invention.

FIG. 10 shows the fifth embodiment of the present invention in which a third glass plate 13 is arranged between the first and the second glass plates 12 and 14; the first liquid crystal layer 16 being arranged between the first and the third glass plates 12 and 14; the second liquid crystal layer 18 being arranged between the third and the second glass plates 13 and 14. The first glass plate 12 has picture electrodes 28, the second glass plate 14 has picture electrodes 34 and a color filter 32 with color portions 32R, 32G and 32B, and the third glass plate 13 has picture electrodes 40 and 42 on the opposite surfaces thereof. Accordingly, the first liquid crystal layer 16 is actuated by the voltage applied between the picture electrodes 28 and 40, and the second liquid crystal layer 18 is actuated by the voltage applied between the picture electrodes 42 and 34.

In this embodiment, the first and the second liquid crystal layers 16 and 18 comprise polymer dispersed liquid crystal capsules. However, it is not necessary to form the first and the second liquid crystal layers 16 and 18 from polymer dispersed liquid crystal capsules because there is a separating glass plate 13 between the first and the second liquid crystal layers 16 and 18 and it may be possible to form these liquid crystal layers 16 and 18 from, for example, a phase change liquid crystal.

Figure 11:
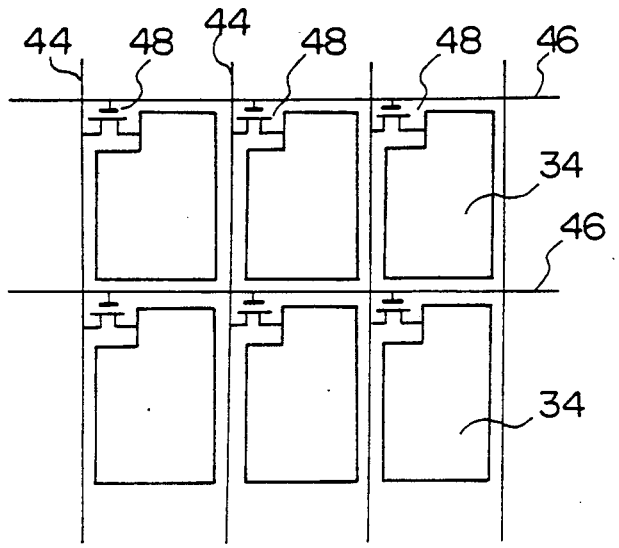
FIG. 11 is a view illustrating the active matrix of the picture electrodes provided in the second glass plate.

FIG. 11 shows an active matrix of the picture electrodes 34 provided in the second glass plate 14. The active matrix comprises a plurality of drain bus lines 44 extending longitudinally and a plurality of gate bus lines 46 extending transversely; each picture electrode 34 being arranged in an area divided by the drain bus lines 44 and the gate bus lines 46 and electrically connected to the drain bus line 44 and the gate bus line 46 by a transistor 48. Recently, the transistors 48 are frequently formed as thin filmed transistors (TFT) directly on the second glass plate 14.

Figure 12:
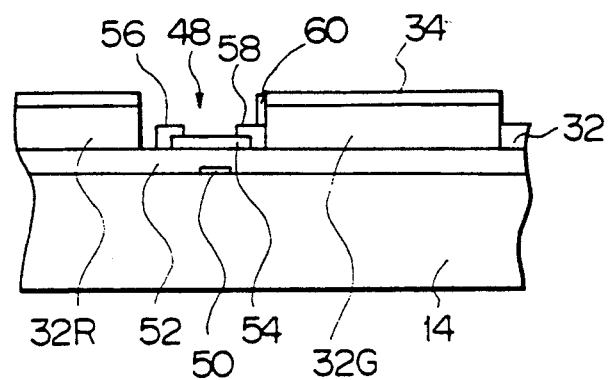
FIG. 12 is a cross-sectional view of the second glass plate of FIG. 11, passing through the thin filmed transistor.

FIG. 12 is a cross-sectional view of the second glass plate 14 having the transistors 48 (only one shown) formed as thin filmed transistors (TFT) on the second glass plate 14. The transistor 48 comprises a base 50 formed on the surface of the second glass plate 14, and a semiconductor layer 54 formed on the second glass plate 14 via an insulating layer 52. A drain 56 and a source 58 are connected to the semiconductor layer 54, with the drain 56 being connected to the drain bus line 44 of FIG. 11 and the gate 50 to the gate bus line 46. The source 58 is connected to the picture electrode 34.

The second glass plate 14 also includes the color filter 32 (color portions 32R, 32G, and 32B) formed thereon adjacent to the transistor 48 and the picture electrodes 34 are formed on the color filter 32. Usually, the picture electrodes 34 are formed by a layer of ITO ($In_2O_3$-$SnO_2$) and have a thickness of approximately 100 angstroms. In contrast to this, the thickness of the color filter 32 is approximately 2 microns and the color filter 32 is thus considerably thicker than the picture electrodes 34. In the embodiment of FIG. 1, the diameter of the liquid crystal capsules 22 of the first liquid crystal layer 16 is approximately 10 microns and the diameter of the liquid crystal capsules 26 of the second liquid crystal layer 18 is approximately 2 microns. It has been found that the second liquid crystal layer 18 presents adequate white turbidity upon application of the voltage when the diameter of the second liquid crystal layer 18 is approximately 2 microns, and the liquid crystal is the type having a large anisotropic indices of refraction.

In FIG. 12, it is necessary to provide a contact element 60 to connect the source 58 of the transistor 48 to the picture electrode 34. The contact element 60 must be of a special design since the color filter 32 is thicker than the transistor 48 and there is a difference between the heights of the source 58 and the picture electrode 34. When the color filter 32 is covered by a protective layer such as a top coat, it is necessary to form an aperture in the protective layer to provide the contact element 60. Further when a thick transparent plate 62 (FIG. 13), as will be described below, is provided, it is necessary to form an aperture in the transparent plate 62 to provide the contact element 60.

Figure 13:
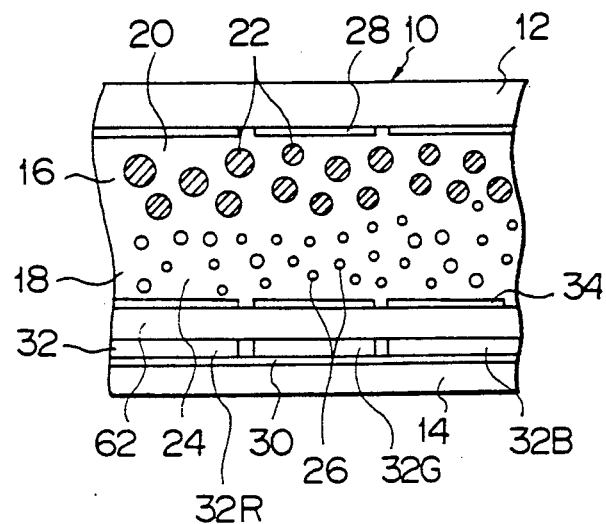
FIG. 13 is a view of a liquid crystal display device according to the sixth embodiment of the present invention.

FIG. 13 shows the sixth embodiment of the present invention. The liquid crystal display device of this embodiment comprises, similar to the embodiment of FIG. 1, first and the second glass plates 12 and 14, a first liquid crystal layer 16 containing a dichroic dye, and a second liquid crystal layer 18 containing no dichroic dye. The first glass plate 12 has picture electrodes 28, and the second glass plate 14 has a color filter 32 and picture electrodes 34.

In this embodiment, a thick transparent plate 62 is provided above the color filter 32, viewed from the first and second liquid crystal layers 16 and 18. The thickness of the transparent plate 62 is preferably within the range from 10 microns to 0.2 millimeters, and in the preferred embodiment, the thickness of the transparent plate 62 is approximately 50 microns.

The transparent plate 62 is provided for providing a distance between the second liquid crystal layer 18 and the color filter 32. As explained above, when the applied voltage is higher than the threshold voltage $V_1$ of the first liquid crystal layer 16 and lower than the threshold voltage $V_2$ of the second liquid crystal layer 18, the light transmits the first liquid crystal layer 16 but is scattered in the second liquid crystal layer 18 to produce a white spot on the display, and there is the possibility that the color filter 32 may be visible beyond the white color filter 32 if the transparent plate 62 is not provided, because the second liquid crystal layer 18 is closely arranged to the color filter 32. According to the present invention, since the second liquid crystal layer 18 is separated from the color filter 32 the thickness of the transparent plate 62, the color filter 32 cannot be seen beyond the white turbid layer 18. This phenomena occurs because, when observing an object via a semi-transparent plate, the object is visible when the semi-transparent plate is close to the object, and the object is not visible when the semi-transparent plate is far from the object.

Figure 14:
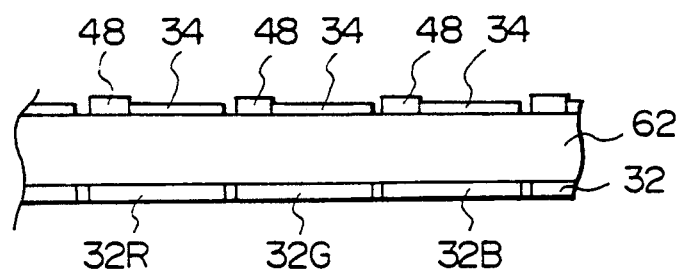
FIG. 14 is a view of a liquid crystal display device according to the seventh embodiment of the present invention.

Further, in this embodiment, the picture electrodes 34 with thin filmed transistors 48 are provided on one of the surfaces of the transparent plate 62 and the color filter 32 is provided on the opposite surface of the transparent plate 62, as shown in FIGS. 13 and 14. In addition, the transparent plate 62 is bonded to the second glass pate 14 with the color filter 32 facing the second plate, and with this arrangement, it is possible to form the picture electrodes 34 and thin filmed transistors 48 in a conventional way, and it is possible to omit the contact element 60 extending along the thickness of the color filter 32 in the embodiment of FIG. 12.

The arrangement in which the picture electrodes 34 with thin filmed transistors 48 are provided on one of the surfaces of the transparent plate 62 and the color filter 32 is provided on the opposite surface of the transparent plate 62 can be applied not only to the liquid crystal display device having the first and the second liquid crystal layers 16 and 18, but also to the other liquid crystal display devices in which a liquid crystal layer is inserted between a pair of plates and picture electrodes and a color filter is provided in one of the plates.

As explained in detail, it is possible, according to the present invention, to provide a bright image without a back light since the incident light is not absorbed by a polarizer, and to provide a black spot and a white spot by the first and the second liquid crystal layers as well as a multi-color display by a color filter provided under the first and the second liquid crystal layers.

We claim:

1. A liquid crystal display device comprising first and second opposite plates, a first liquid crystal layer having a threshold voltage and a dichroic dye contained therein, a second liquid crystal layer having a threshold voltage different from that of the first liquid crystal layer and light scattering properties, and a color filter provided on one of the plates; the first and second liquid crystal layers being stratified separately from each other and superposed one above the other between the plates.

2. A liquid crystal device according to claim 1, wherein at least one of the first and the second liquid crystal layers comprises a polymer dispersed liquid crystal.

3. A liquid crystal device according to claim 1, wherein the first and second liquid crystal layers are arranged continuously and stratified separately from each other between the plates.

4. A liquid crystal device according to claim 1, wherein a third plate is arranged between the first and the second plates; the first liquid crystal layer being arranged between the first and the third plates; the second liquid crystal layer being arranged between the third and the second plates.

5. A liquid crystal device according to claim 1, wherein a reflecting layer is arranged between the first and the second plates; the other plate being transparent and providing a displaying surface.

6. A liquid crystal device according to claim 5, wherein the threshold voltage of one of the first and the second liquid crystal layers on the side of the displaying surface is lower than the threshold voltage of the other liquid crystal layer on the side of the reflecting layer.

7. A liquid crystal device according to claim 1, wherein the first and the second liquid crystal layers comprise polymer dispersed liquid crystal capsules having different threshold voltages; the liquid crystal capsules of one of the liquid crystal layers having a lower threshold voltage and a larger diameter than those of the liquid crystal capsules of the other liquid crystal layer.

8. A liquid crystal device according to claim 1, wherein the first plate has an electrode means and the second plate has said color filter and picture electrodes.

9. A liquid crystal device according to claim 1, wherein a thick transparent plate is provided above the color filter when viewed from the liquid crystal layers.

10. A liquid crystal device according to claim 9, wherein the first plate has an electrode means, and the transparent plate is carried by the second plate and has said color filter and picture electrodes.

11. A liquid crystal device according to claim 10, wherein the transparent plate has first and second surfaces; the color filter being provided in the first surface of the transparent plate; the picture electrodes with thin film transistors being provided in the second surface of the transparent plate.

12. A liquid crystal device according to claim 11, wherein the transparent plate is bonded to the second plate with the first surface of the transparent plate faced to the second plate.

13. A liquid crystal display device as set forth in claim 1, wherein said one plate has first and second surfaces, said device further comprising electrode means on the other of said plates and picture electrodes including thin film transistors on the first surface of said one plate, said color filter being disposed on the second surface of said one plate.

* * * * *

UNITED STATES PATENT AND TRADEMARK OFFICE
CERTIFICATE OF CORRECTION

PATENT NO. : 5,317,431
DATED : May 31, 1994
INVENTOR(S) : HIDEFUMI YOSHIDA et al.

It is certified that error appears in the above-indentified patent and that said Letters Patent is hereby corrected as shown below:

Column 5, line 50, after "23" delete ".".

Signed and Sealed this

Sixth Day of September, 1994

BRUCE LEHMAN

Attest:

Attesting Officer

Commissioner of Patents and Trademarks